US012191591B2

(12) United States Patent
Zhang et al.

(10) Patent No.: US 12,191,591 B2
(45) Date of Patent: Jan. 7, 2025

(54) BOARD-TO-BOARD PLUG

(71) Applicant: KUNSHAN KTA COMMUNICATION TECHNOLOGY CO., LTD., Jiangsu (CN)

(72) Inventors: Zicai Zhang, Jiangsu (CN); Yabin Ji, Jiangsu (CN)

(73) Assignee: KUNSHAN KTA COMMUNICATION TECHNOLOGY CO., LTD., Jiangsu (CN)

(*) Notice: Subject to any disclaimer, the term of this patent is extended or adjusted under 35 U.S.C. 154(b) by 300 days.

(21) Appl. No.: 17/860,513

(22) Filed: Jul. 8, 2022

(65) Prior Publication Data

US 2022/0352662 A1 Nov. 3, 2022

Related U.S. Application Data

(63) Continuation of application No. PCT/CN2021/071749, filed on Jan. 14, 2021.

(30) Foreign Application Priority Data

Jan. 17, 2020 (CN) ......................... 202010056771.8
Jan. 17, 2020 (CN) ......................... 202010056775.6

(51) Int. Cl.
*H01R 12/00* (2006.01)
*H01R 9/24* (2006.01)
(Continued)

(52) U.S. Cl.
CPC ............. *H01R 12/716* (2013.01); *H01R 9/24* (2013.01); *H01R 13/516* (2013.01); *H01R 13/6471* (2013.01); *H01R 24/40* (2013.01)

(58) Field of Classification Search
CPC ...... H01R 12/716; H01R 9/24; H01R 13/516; H01R 13/517
See application file for complete search history.

(56) References Cited

U.S. PATENT DOCUMENTS 6,645,001 B2 * 11/2003 Okano ................ H01R 12/592 439/492
6,830,478 B1 * 12/2004 Ko ...................... H01R 12/598 439/607.41

(Continued)

FOREIGN PATENT DOCUMENTS

CN 108346879 A 7/2018
CN 207572564 U 7/2018

(Continued)

OTHER PUBLICATIONS

International Search Report mailed on Mar. 20, 2021, issued in corresponding International Application No. PCT/CN2021/071749, filed on Jan. 14, 2021, and its English translation thereof, 8 pages.

(Continued)

*Primary Examiner* — Phuong Chi Thi Nguyen
(74) *Attorney, Agent, or Firm* — IPkey PLLC

(57) ABSTRACT

A board-to-board plug, comprising an insulating seat (20) integral to a metal insert (30), several signal terminals (40) arranged inside the insulating seat (20), and a shielding housing (10) coated outside the insulating seat (20). The insulating seat (20) comprises an engagement end (21) provided with terminal slots (214), terminal blocks (24) formed by extending from the engagement end (21) to the rear direction, and a pair of extension arms (22) formed by extending from both transverse sides of the terminal block (24) to the rear direction. The metal insert (30) comprises a board body portion (31) formed between a pair of extension arms (22), and several grounding terminals (37) bent from the front end of the board body portion (31) and extending (Continued)

into the terminal slots (214). The grounding terminals (37) and the signal terminals (40) are arranged at intervals.

20 Claims, 25 Drawing Sheets

(51) Int. Cl.

| | |
|---|---|
| ***H01R 12/71*** | (2011.01) |
| ***H01R 13/516*** | (2006.01) |
| ***H01R 13/6471*** | (2011.01) |
| ***H01R 24/40*** | (2011.01) |

(56) References Cited

U.S. PATENT DOCUMENTS

| | | | | |
|---|---|---|---|---|
| 6,939,164 | B2 * | 9/2005 | Noro .................... | H01R 4/2429 439/492 |
| 2017/0288333 | A1 | 10/2017 | Yao et al. | |

FOREIGN PATENT DOCUMENTS

| | | | |
|---|---|---|---|
| CN | 109546388 | A | 3/2019 |
| CN | 110247202 | A | 9/2019 |
| CN | 110474201 | A | 11/2019 |
| CN | 110556646 | A | 12/2019 |
| CN | 110994258 | A | 4/2020 |
| CN | 111146637 | A | 5/2020 |
| CN | 111146652 | A | 5/2020 |
| CN | 211579119 | U | 9/2020 |
| CN | 211789703 | U | 10/2020 |
| JP | 2008258112 | A | 10/2008 |

OTHER PUBLICATIONS

Chinese Notice of Allowance mailed on Sep. 5, 2024, issued in the corresponding Chinese Application No. 202010056775.6; 6 pages.
Chinese Notice of Allowance (Chinese Application No. 202010056771.8, filed Jan. 17, 2020) mailed on Oct. 14, 2024 (4 pages).

* cited by examiner

BOARD-TO-BOARD PLUG

TECHNICAL FIELD

The present disclosure relates to the field of radio-frequency connectors, and in particular, to a board-to-board plug.

BACKGROUND

Existing mobile phone PCBs may generally be provided with radio-frequency connectors for connecting coaxial cables to transmit radio-frequency signals, such as antenna signals and high-frequency signals between different boards. In the era of 5G communication, multi-antenna transmission is required, and conventional single-channel radio-frequency connectors can no longer meet requirements. Among existing alternative solutions, a technical solution of using a board-to-board connector to realize multi-channel antenna signal transmission has emerged. Chinese Patent No. 201910206829. X discloses a cable connector apparatus, in which multi-channel antenna signals are transmitted through a combination of coaxial lines. The cable connector apparatus includes an insulating body, a conductive terminal and a metal sheet integrally formed in the insulating body, a shielding housing, and a cable assembly.

SUMMARY

In view of the above, it needs to provide a board-to-board plug to solve the technical problems in the related art, for example, cutting a terminal strip is complex, soldering is difficult, and contact between plugs is not close and reliable enough.

In order to solve the above technical problems, the present disclosure provides a board-to-board plug, including an insulating seat, a metal insert, conductive terminals provided in the insulating seat, a cable assembly provided at a rear end of the insulating seat and electrically connected to the conductive terminals, and a shielding housing enclosing an outer side of the insulating seat. The insulating seat and the metal insert are formed into one piece. The insulating seat includes an engagement end provided with terminal slots formed by passing therethrough in a vertical direction. The engagement end includes a top wall, a protruding portion formed by protruding downward from a front end of the top wall, an internal insertion space provided at a lower surface of the engagement end and located at a rear side of the protruding portion, barriers separating the terminal slots from one another, and a reinforcing arm portion formed at both transverse sides of the protruding portion and the internal insertion space. The metal insert includes a reinforcing structure formed outside the reinforcing arm portion. The reinforcing structure includes a reinforcing bottom wall formed at a bottom surface of the reinforcing arm portion, and a front enclosure portion bending and extending upward from a front end of the reinforcing bottom wall and formed at a front wall surface of the reinforcing arm portion. The front enclosure portion is stamped forward to form a convex hull.

In order to solve the above technical problems, the present disclosure further provides a board-to-board plug, including an insulating seat, a metal insert, conductive terminals provided in the insulating seat, and a shielding housing enclosing an outer side of the insulating seat. The insulating seat and the metal insert are formed into one piece. The insulating seat includes an engagement end provided with terminal slots, terminal blocks formed by extending from the engagement end to a rear direction, and a pair of extension arms formed by extending from both transverse sides of the terminal blocks to the rear direction. The conductive terminals include signal terminals and grounding terminals arranged at intervals. The metal insert includes a board body portion formed between the pair of extension arms. One of the grounding terminals includes a retaining portion retained in one of the terminal blocks, a solder pin formed by extending backward from the retaining portion, and an elastic contact arm extending forward from the retaining portion into one of the terminal slot. Solder pins of the signal terminals are exposed to the terminal blocks, and the solder pins of the grounding terminals pass through the terminal blocks to extend to the board body portion and are electrically connected to the board body portion.

In order to solve the above technical problems, the present disclosure further provides a board-to-board plug, comprising an insulating seat, conductive terminals provided in the insulating seat, a cable assembly provided at a rear end of the insulating seat and electrically connected to the conductive terminals, and a shielding housing coated outside the insulating seat. The insulating seat comprises an engagement end provided with terminal slots formed by passing therethrough in a vertical direction, an internal insertion space extending transversely and communicated with the terminal slots is formed at the engagement end, and the conductive terminals are arranged respectively corresponding to the terminal slots and exposed to the internal insertion space. The cable assembly comprises cables, one of which comprises at least a central conductor and a braided layer at a periphery of the central conductor. The board-to-board plug further comprises an isolation assembly, and the isolation assembly comprises: a connecting portion formed transversely in the engagement end, and spacers formed by extending longitudinally downward from an end of the connecting portion; and each of the conductive terminals is arranged at an interval between two adjacent ones of the spacers, respectively, and the isolation assembly is electrically connected to the braided layer.

According to the board-to-board plug in the present disclosure, the metal insert is provided with a reinforcing structure enclosing an outer side of the reinforcing arm portion of the insulating seat, so as to prevent damages to the reinforcing arm portion made of plastic when the plug is plugged into a socket. At the same time, the front end of the board body portion of the metal insert bends and extends to form several grounding terminals, the signal terminals and the grounding terminals are arranged at intervals, and only solder pins of the signal terminals are required to be exposed at the terminal blocks, thereby increasing a distance between the solder pins and reducing the difficulty of soldering. Moreover, the grounding terminals are directly integrally formed onto the metal insert, and the solder pins of the signal terminals are in a same horizontal plane to realize bending of a terminal strip at a time, thereby reducing the difficulty of a manufacturing process.

BRIEF DESCRIPTION OF DRAWINGS

The accompanying drawings illustrated herein are intended to provide further illustration of the present disclosure and form part of the present disclosure, and schematic embodiments of the present disclosure and the descriptions thereof are intended to explain the present disclosure and do not constitute improper limitations on the present disclosure. In the drawings, Embodiment One

Embodiment Two

Figure 21:
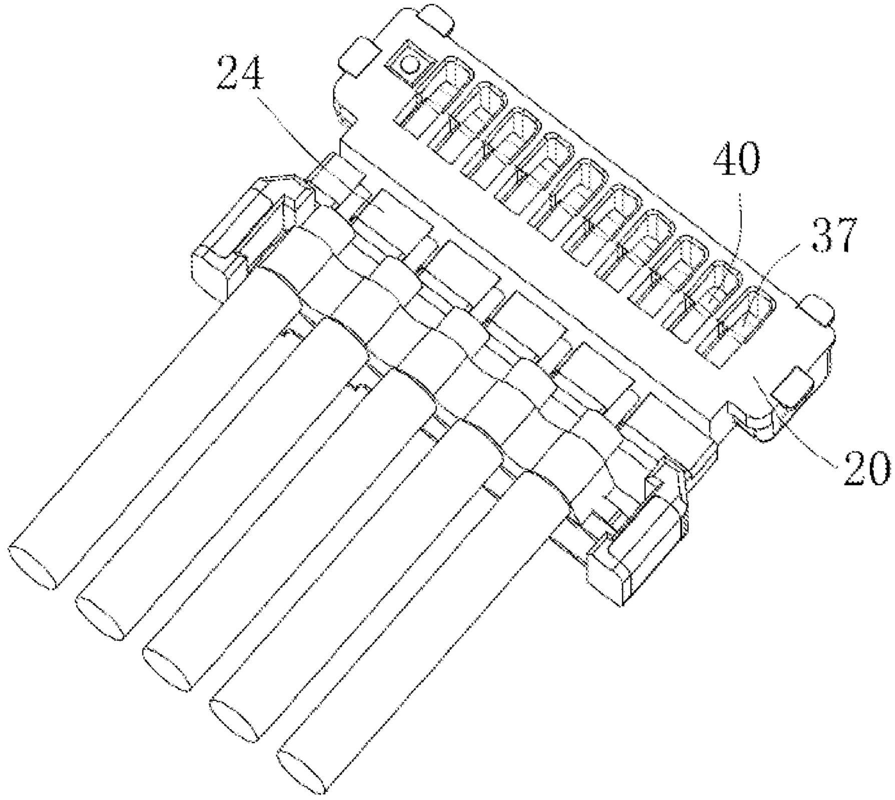
Figure 22:
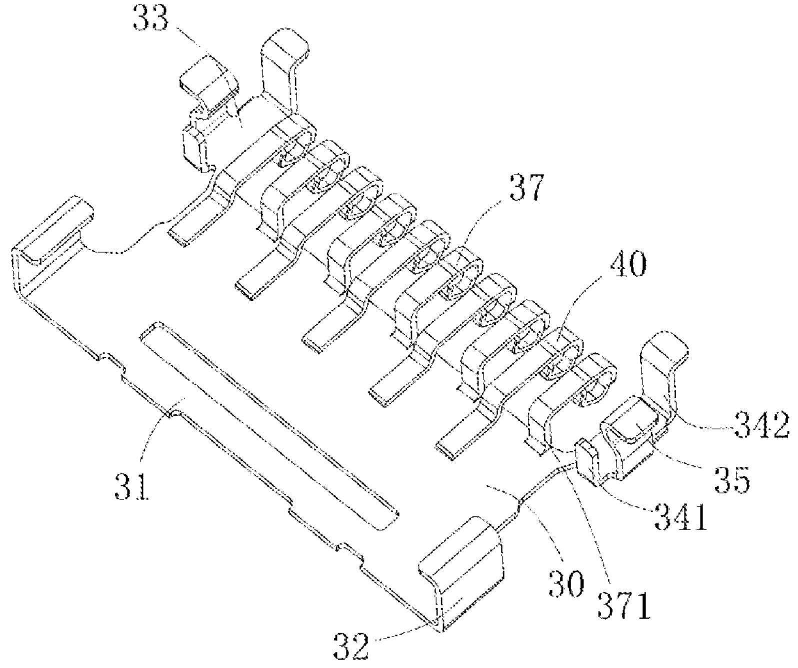
Figure 23:
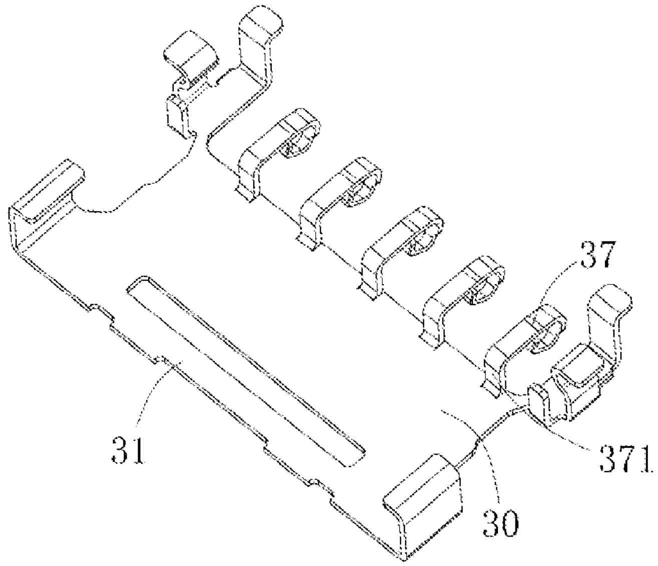

FIG. 21 is a three-dimensional assembled view of removal of a shielding housing of a board-to-board plug according to Embodiment two;

FIG. 22 is a schematic diagram illustrating a position state of a metal insert and conductive terminals of the board-to-board plug according to Embodiment two; and FIG. 23 is a three-dimensional view of the metal insert of the board-to-board plug according to Embodiment two.

Embodiment Three

Figure 24:
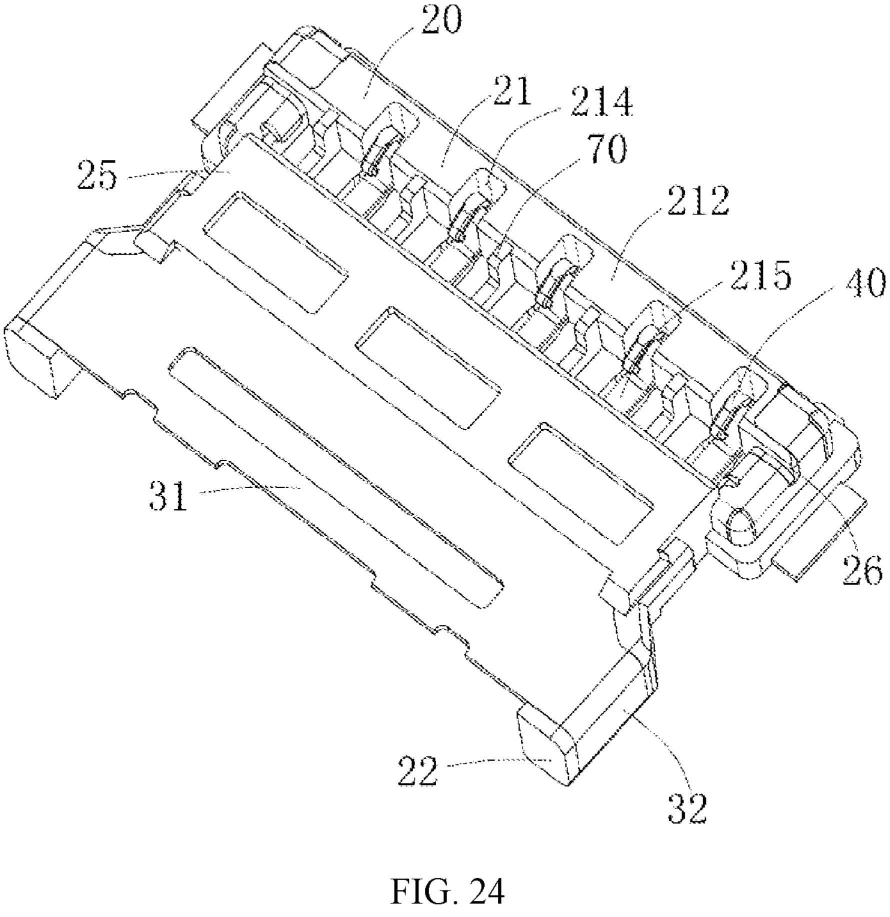
Figure 25:
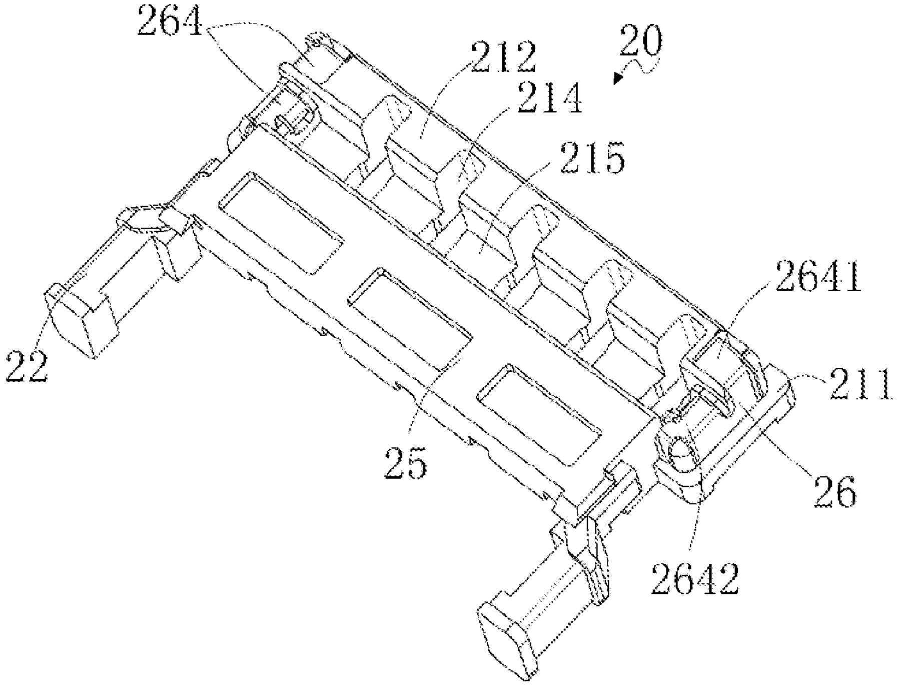
Figure 26:
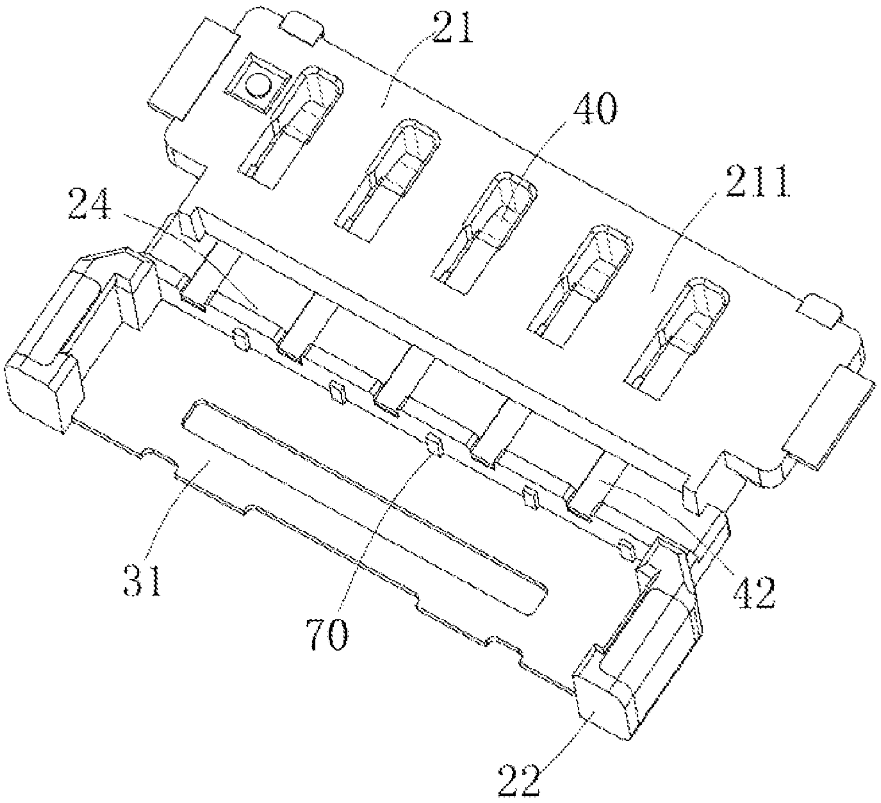
Figure 27:
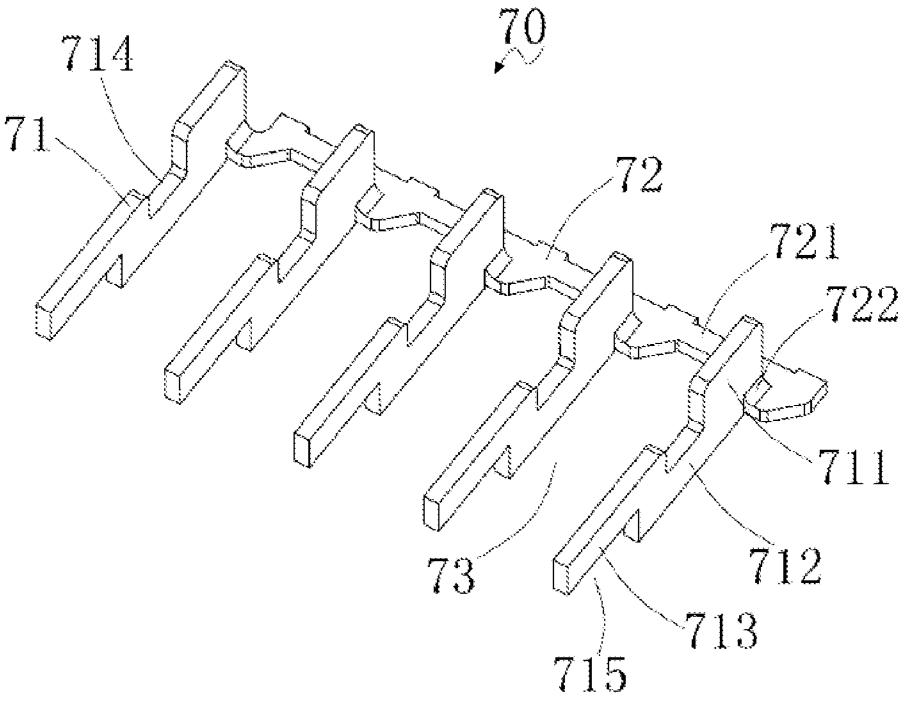
Figure 28:
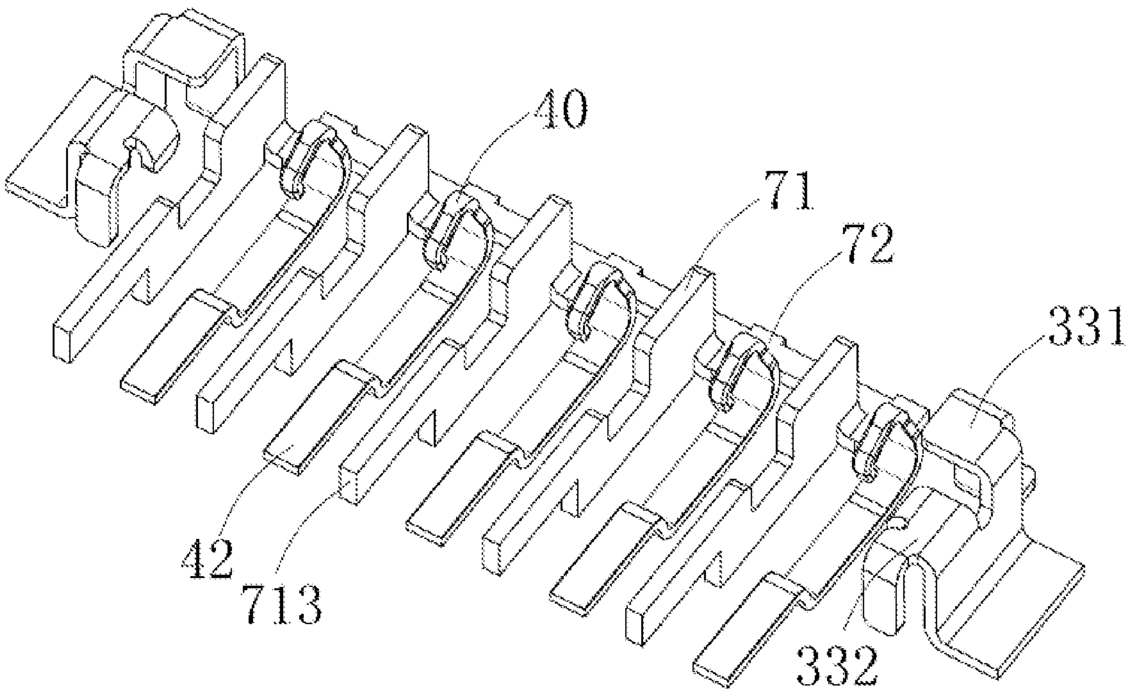
Figure 29:
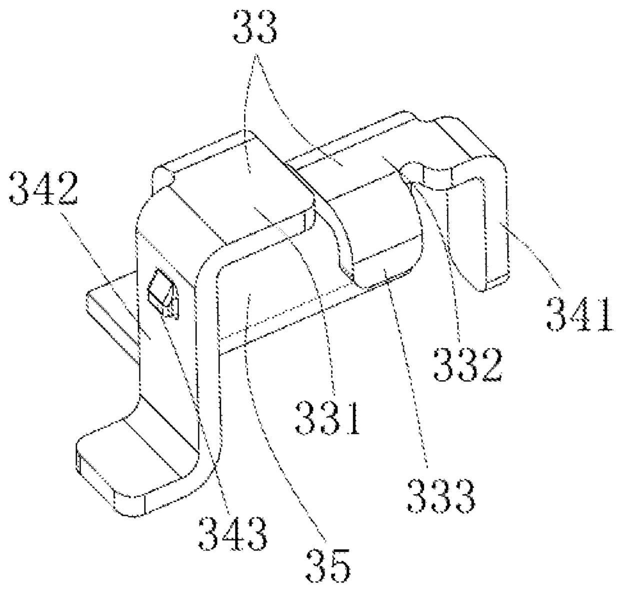

FIG. 24 is a three-dimensional view of integration of a metal insert, an isolation assembly and conductive terminals of a board-to-board plug into an insulating seat according to Embodiment three;

FIG. 25 is a three-dimensional view of the insulating seat of the board-to-board plug according to Embodiment three;

FIG. 26 is a three-dimensional view of integration of the metal insert, the isolation assembly and the conductive terminals of the board-to-board plug into the insulating seat according to Embodiment three from another perspective;

FIG. 27 is a three-dimensional view of the isolation assembly of the board-to-board plug according to Embodiment three;

FIG. 28 is a schematic diagram illustrating a position relation of the isolation assembly and the conductive terminals of the board-to-board plug according to Embodiment three; and FIG. 29 is a three-dimensional view of part of the metal insert of the board-to-board plug according to Embodiment three.

DESCRIPTION OF EMBODIMENTS

In order to make the objectives, technical solutions and advantages of the present disclosure clearer, the technical solutions of the present disclosure will be described in the following in combination with specific embodiments of the present disclosure and the corresponding accompanying drawings. It is apparent that the embodiments described herein are merely some rather than all of the embodiments of the present disclosure. All other embodiments obtained by those skilled in the art based on the embodiments of the present disclosure without creative efforts shall fall within a scope of the present disclosure.

Figure 1:
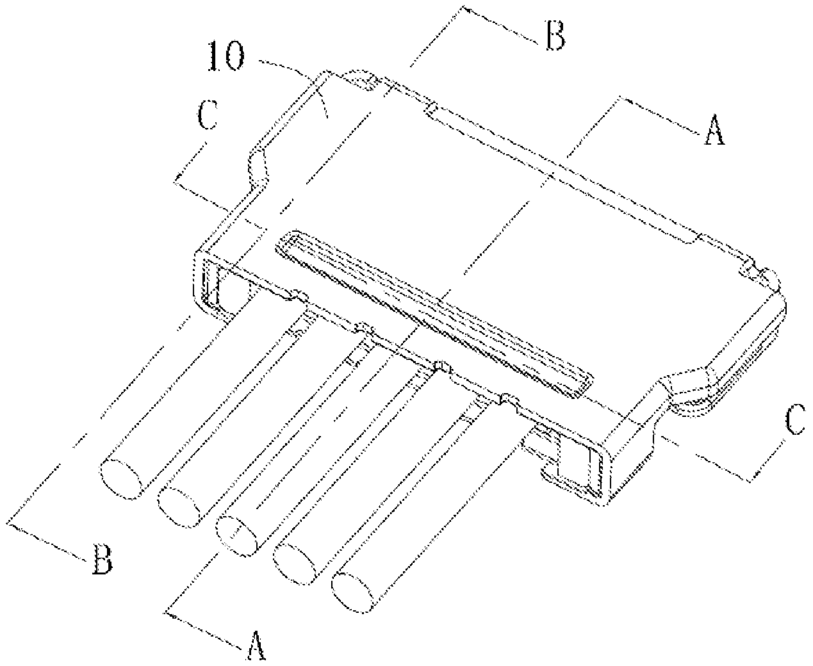
FIG. 1 is a three-dimensional assembled view of a board-to-board plug according to Embodiment one.

Directions defined in the present disclosure are subjected to FIG. 1. Direction X refers to “front” in a front-rear direction (longitudinal direction), Direction Y refers to “right” in a left-right direction (transverse direction), and Direction Z refers to “up” in an up-down direction (vertical direction).

Embodiment One

FIG. 1 to FIG. 20 are drawings of the specification of Embodiment one, in which a product structure of Embodiment one is displayed in detail.

Figure 2:
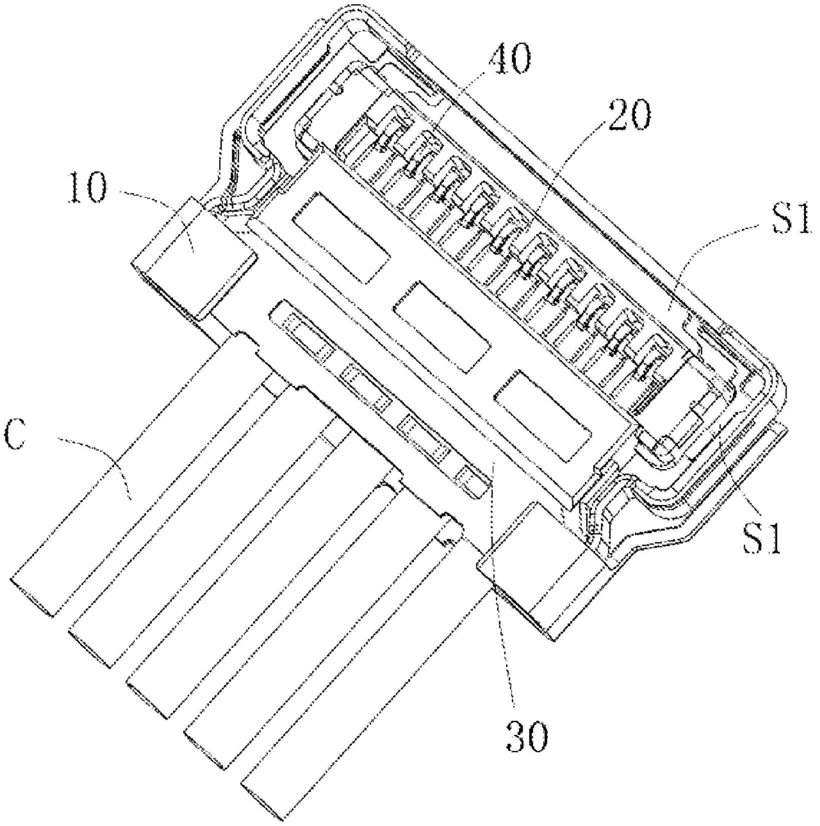
FIG. 2 is a three-dimensional assembled view of the board-to-board plug according to Embodiment one from another perspective.
Figure 3:
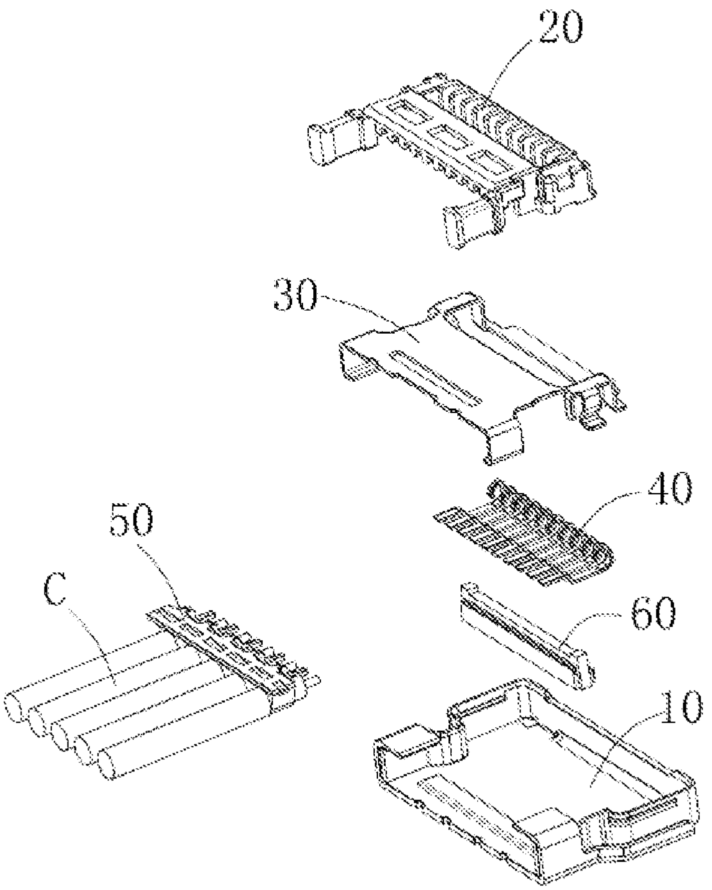
FIG. 3 is a three-dimensional exploded view of the board-to-board plug according to Embodiment one.

Referring to FIG. 1 to FIG. 3, a board-to-board plug according to the present disclosure includes an insulating seat 20, a metal insert 30 formed in the insulating seat 20, a terminal module assembled in the insulating seat 20, a cable assembly, and a shielding housing 10 coated outside the insulating seat 20.

Figure 4:
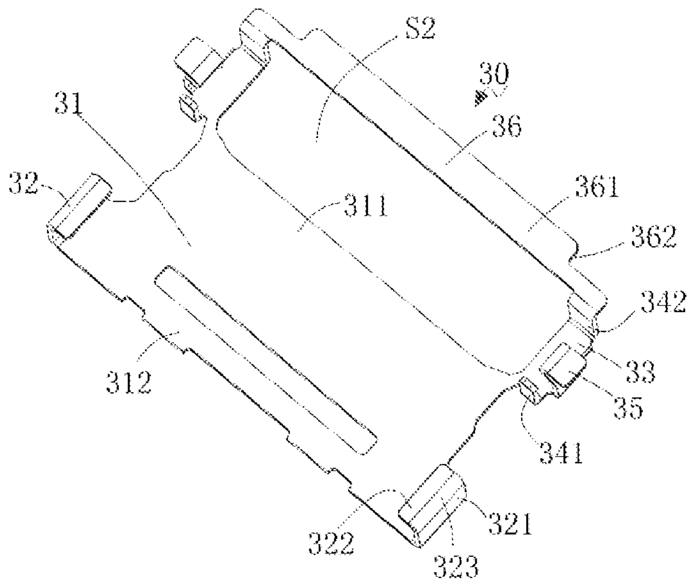
FIG. 4 is a three-dimensional view of a metal insert of the board-to-board plug according to Embodiment one.
Figure 5:
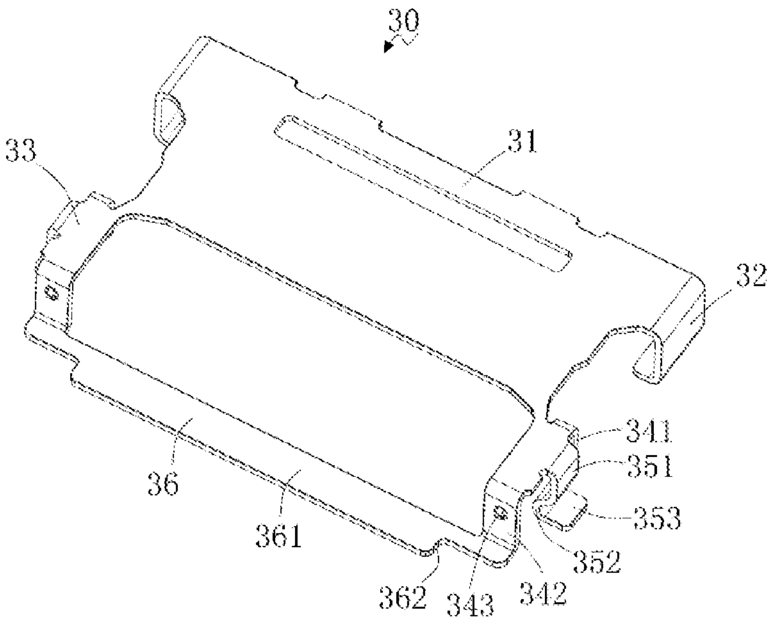
FIG. 5 is a three-dimensional view of the metal insert of the board-to-board plug according to Embodiment one from another perspective.

Referring to FIG. 4 and FIG. 5, the metal insert 30 includes a board body portion 31 provided with a front board portion 311 and a rear board portion 312, a clamping portion 32 formed by bending and extending upward from both transverse sides of the rear board portion 312, and a reinforcing structure formed by extending forward from both transverse sides of the front board portion 311. The clamping portion 32 includes a vertical wall 321 formed by bending upward from the both transverse sides of the rear board portion 312 and then extending vertically, a bent top 322 formed by bending and extending inward from a top of the vertical wall 321, and an arc edge 323 formed at a joint of the vertical wall 321 and the bent top 322. The reinforcing structure includes a reinforcing bottom wall 33 formed by extending from both transverse sides of the front board portion 311 to a front outer side, a rear enclosure portion 341 formed by bending and extending upward from a rear side of the reinforcing bottom wall 33, a front enclosure portion 342 formed by bending and extending upward from a front side of the reinforcing bottom wall 33, a side enclosure portion 35 formed by bending and extending upward from a transverse outer side of the reinforcing bottom wall 33, and a connecting strip 36 for connecting tops of a pair of the front enclosure portions 342. The front enclosure portion 342 is stamped forward to form a convex hull 343. The side enclosure portion 35 includes an upper extension portion 351 formed by bending and extending upward, a recessed portion 352 formed by bending inward from the upper extension portion 351, and a spot soldering portion 353 formed by bending and extending horizontally outward from a top of the recessed portion 352. The connecting strip 36 includes a positioning convex portion 361 formed by protruding forward, and positioning step portions 362 formed at both transverse sides of the positioning convex portion 361.

Still referring to FIG. 6 to FIG. 9, the insulating seat 20 includes an engagement end 21, terminal blocks 24 formed by extending from the engagement end 21 to the rear direction, and a pair of extension arms 22 formed by extending from both transverse sides of the terminal block 24 to the rear direction. The engagement end 21 includes a top wall 211, a protruding portion 212 formed by protruding downward from a front end of the top wall 211, terminal slots 214 formed by running through the top wall 211 and the protruding portion 212, several barriers 213 separating the terminal slots 214 from one another, and an internal insertion space 215 provided at a rear bottom surface of the protruding portion 212. Both transverse sides of the terminal block 24 are recessed inward to form a recessed portion 249. Two reinforcing arm portions 26 are formed at both transverse sides of the terminal slots 214. The reinforcing arm portion 26 includes a front wall surface 261 and a rear wall surface 262 respectively located at front and rear sides, an outer wall surface 263 located at a transverse outer side, and a bottom surface 264. The protruding portion 212 and the internal insertion space 215 are located between two reinforcing arm portions 26. Bottom rear sides of the barriers 213 are recessed upward to form a part of the internal insertion space 215.

The top of the insulating seat 20 is provided with the terminal blocks 24 at a rear side of the engagement end 21. A filling slot 23 is provided between the terminal block 24 and the engagement end 21. The top of the terminal slot 214 extends backward to form a first groove 241 and a second groove 242 respectively at front and rear ends of the filling slot 23. The first groove 241 is located at a top rear side of the engagement end 21, and the second groove 242 is located at the terminal block 24. First clamping blocks 243 are arranged at both transverse sides of the first groove 241. The second groove 242 is provided with second clamping blocks 244 and third clamping blocks 245 respectively at both transverse sides of front and rear ends.

The metal insert 30 and the insulating seat 20 are formed into one piece by injection molding. Both transverse sides of the board body portion 31 are formed in the extension arm 22 and the terminal block 24. The bottom of the front board portion 311 is enclosed by the insulating seat 20 and provided with a thickening portion 25 enclosing the bottom of the front board portion 311. The clamping portion 32 is formed at the pair of extension arms 22. The vertical wall 321 and the bent top 322 of the clamping portion 32 are enclosed on a transverse outer side and the top of the extension arm 22, respectively. A space of the board body portion 31 between the pair of extension arms 22 forms a clamping space S3 for assembling the cable assembly. The extension arm 22 is provided with a limit notch 223 at an inner side of the clamping space S3. The reinforcing structure is formed at the reinforcing arm portion 26 of the engagement end 21. The front enclosure portion 342 encloses an outer side of the front wall surface 261 of the side wall 26. The rear enclosure portion 341 encloses an outer side of the rear wall surface 262. The side enclosure portion 35 encloses the side wall surface 263. The reinforcing bottom wall 33 covers the bottom surface 264 of the side wall 26. The upper extension portion 351 of the side enclosure portion 35 encloses an outer side of the side wall surface 263. The recessed portion 352 is embedded into the reinforcing arm portion 26. The spot soldering portion 353 extends to an upper surface of the top wall 211 of the engagement end 21 and is fixed to the shielding housing 10 by spot soldering/welding.

Still referring to FIG. 11 to FIG. 13, and FIG. 15, the terminal module includes several conductive terminals 40, and an insulating block 60 forming and fixing the conductive terminals 40 into the insulating seat 20. The conductive terminals 40 include several signal terminals and grounding terminals arranged at intervals. Each conductive terminal 40 includes a retaining portion 41 limited in the first groove 241, a solder pin 42 extending from the retaining portion 41 to the rear direction and limited in the second groove 242, and an elastic contact arm 43 formed by extending forward from the retaining portion 41 and located in the terminal slot 214. The elastic contact arm 43 is suspended in the terminal slot 214. The elastic contact arm 43 includes a first elastic arm 431 formed by extending diagonally forward and downward, a second elastic arm 432 formed by bending and extending downward from a front end of the first elastic arm 431, a third elastic arm 433 formed by extending diagonally backward and upward from a tail end of the second elastic arm 432, a bent end 434 formed by bending forward and upward from a tail end of the third elastic arm 433, and a contact portion 435 formed at a position where the third elastic arm 433 and the bent end 434 are bent. A rear end of the retaining portion 41 extends diagonally downward to form a sunk portion 44. The solder pin 42 is formed by bending from a rear end of the sunk portion 44 and then extending horizontally. The sunk portion 44 is suspended in the filling slot 23 and filled and fixed by the insulating block 60. The filling slot 23 is filled up with the insulating block 60 to fix the conductive terminal 40 to the insulating seat 20. The first clamping blocks 243 at both transverse sides of the first groove 241 limit the retaining portion 41. The second clamping blocks 244 at both transverse sides of the second groove 242 limit the solder pin 42.

All the conductive terminals 40 are connected to a terminal strip 45 through rear ends of the solder pins 42. A pre-breaking slot 46 is arranged at an upper surface of a junction between the terminal strip 45 and the solder pin 42. The conductive terminals 40 in this embodiment are connected, through the terminal strip 45, to be entirely inserted into the terminal slot 214 and the first and second grooves 241 and 242. Then, the insulating block 60 is formed by injection molding or heat melting, to fill up the filling slot 23 with the insulating block 60 and fix the conductive terminal 40. After the insulating block 60 is formed, the terminal strip 45 is bent upward and breaks. The insulating block 60 further includes a protruding pressing portion 61 located above the first elastic arm 431 and formed by protruding and extending toward the terminal slot 214. A front end of the protruding pressing portion 61 is not in contact with the barrier 213.

Figure 11:
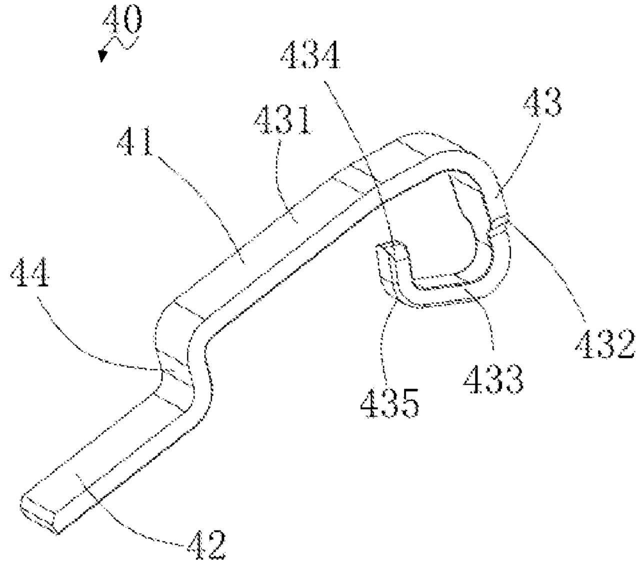
FIG. 11 is a three-dimensional view of a conductive terminal of the board-to-board plug according to Embodiment one.

Still referring to FIG. 11, the shielding housing 10 includes a cover plate 11 covering the top of the insulating seat 20 and an upper part of the insulating block 60, a shielding front frame 12 formed by bending and extending downward from a front end of the cover plate 11, a shielding side frame 13 formed by bending and extending backward from the shielding front frame 12, and an outer cladding portion 14 enclosing an outer side of the shielding side frame 13 and formed by bending downward from two transverse outer sides of the cover plate 11. A positioning hole 121 is formed at a joint of the cover plate 11 and the shielding front frame 12. The shielding side frame 13 includes a side frame body 131 formed by bending backward from the shielding front frame 12, an inner bent portion 132 abutting against two sides of the terminal block 24 and formed by bending inward from the side frame body 131, and a tail frame portion 133 formed by extending backward from the inner bent portion 132. The outer cladding portion 14 includes a front cladding portion 141 enclosing an peripheries of the side frame body 131 and the inner bent portion 132, a rear cladding portion 142 formed by bending and extending downward from both transverse sides of the cover plate 11 in the tail frame portion 133, and a bent enclosure portion 143 formed by bending inward from the bottom of the rear cladding portion 142. An external insertion space S1 is formed between the shielding front frame 12, the side frame body 131, and the engagement end 21. The spot soldering portion 353 of the side enclosure portion 35 of the reinforcing structure is flush with a surface of the top wall 211 of the engagement end 21 and fits with the cover plate 11. The cover plate 11 electrically contacts the spot soldering portion 353 or is fixed to the spot soldering portion 353 by spot soldering.

Still referring to FIG. 14 to FIG. 20, the cable assembly includes several cables C and a cable bracket 50 integrally fixing the several cables C. The cable C is a coaxial line. The cable C includes a central conductor C1, an inner insulating layer C2 enclosing an outer side of the central conductor C1, a braided layer C3 enclosing a periphery of the inner insulating layer C2, and an outer insulating layer C4 enclosing an outer side of the braided layer C3. The cable bracket 50 includes a soldering lug 51 fitting with and fixed to an upper surface of the rear board portion 312, and conductive adhesive or soldering tin 52 fixing the braided layers C3 of the several cables C to the soldering lug 51. The soldering lug 51 includes a soldering lug main body 511 fixed to the rear board portion 312 by spot soldering, an upward bent portion 515 formed by bending and extending upward from a front end of the soldering lug main body 511, and a connecting pin 516 formed by bending and extending forward vertically from the upward bent portion 515. The soldering lug main body 511 includes several stamping bumps 512 formed by stamping upward from the soldering lug main body 511, and cable limit slots 513 located between the stamping bumps 512 to separate and limit the braided layers C3. The central conductors C1 of the cables C and the connecting pins 516 are arranged at intervals and respectively lapped on solder pins 42 of the grounding terminals and the signal terminals on the terminal blocks 24, and then the connecting pins 516 and the central conductors C1 are soldered to the solder pins 42 by a soldering process. The third clamping blocks 245 separate and limit the connecting pins 516 and the central conductors C1.

The cable assembly is assembled in the clamping space S3 located between a pair of extension arms 22 above the rear board portion 312. The soldering lug 51 is fixed to the rear board portion 312 by spot soldering.

Figure 17:
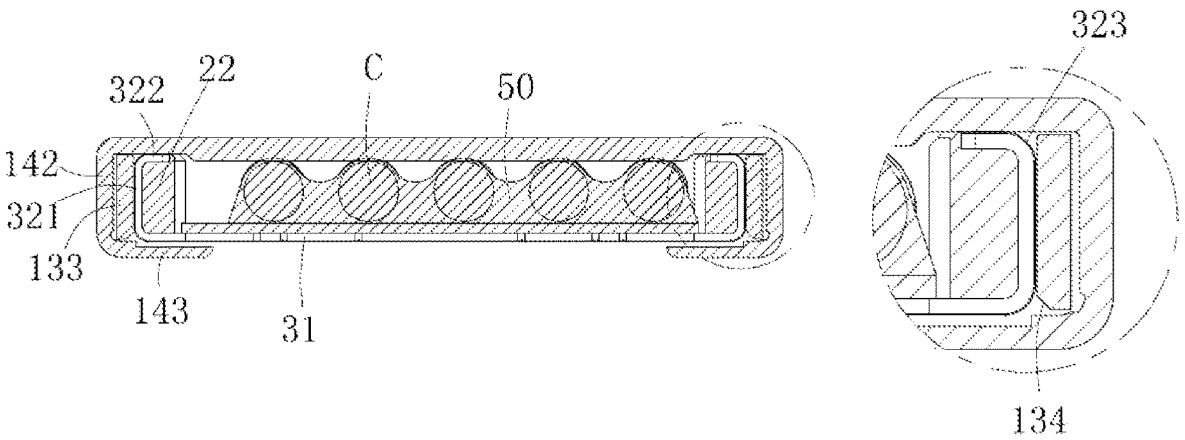
FIG. 17 is a sectional view and a partial enlarged view taken along a line C-C shown in FIG. 1.
Figure 18:
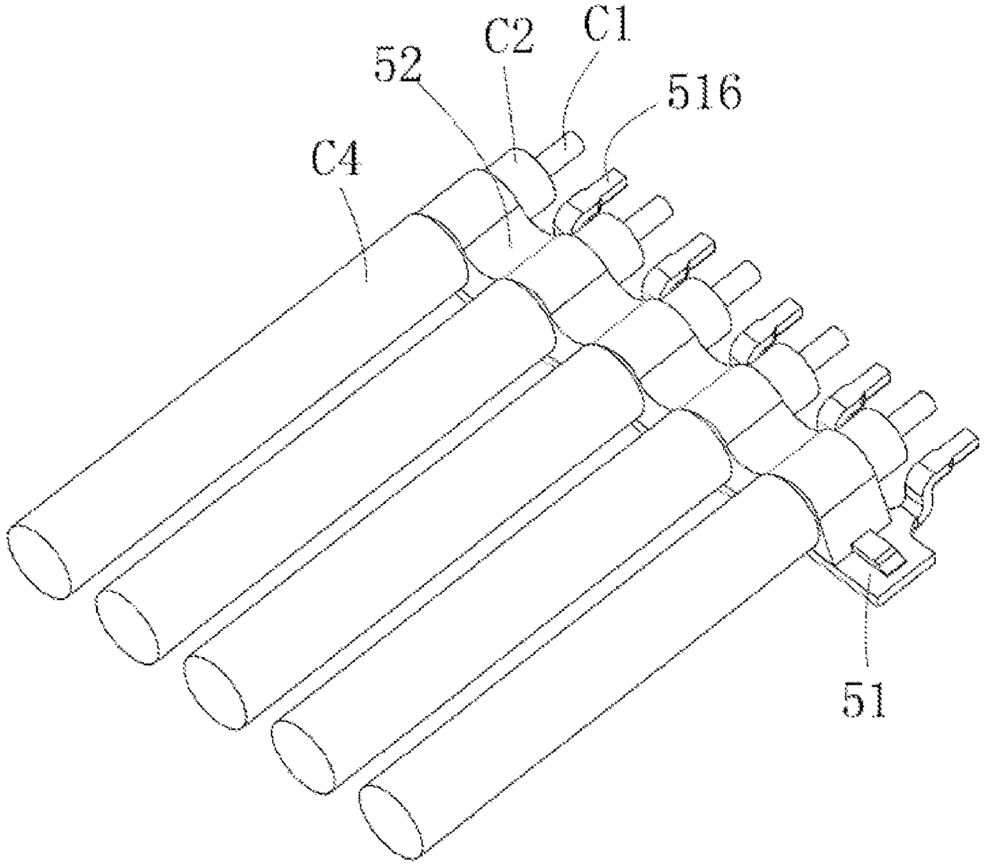
FIG. 18 is a three-dimensional view of a cable bracket of the board-to-board plug according to Embodiment one.

Particularly referring to FIG. 17, during assembling, the bent enclosure portion 143 of the shielding housing 10 is not bent at first, and the insulating seat 20 and the conductive terminal 40 and the metal insert 30 thereon are snapped into the shielding housing 10 first. In this case, the arc edge 323 of the clamping portion 32 of the metal insert 30 is snapped in along a chamfer surface 134 of the tail frame portion 133 of the shielding housing 10, and the arc edge 323 of the clamping portion 32 of the metal insert 30 can be easily in under the guidance of the arc edge 323 and the chamfer surface 134, thereby preventing damages to the tail frame portion 133 or the extension arm 22 caused by overlap of insertion in the vertical direction.

In Embodiment one, the top of the vertical wall 321 of the clamping portion 32 is bent inward to form the bent top 322, so that a smooth arc edge 323 is formed at a top outer side of the vertical wall 321. An inclined chamfer surface 134 to guide the arc edge 323 is formed at the top of the inner side of the tail frame portion 133 of the shielding housing 10, so that the vertical wall 321 of the metal insert 30 is easily inserted between a pair of tail frame portions 133, thereby preventing damages to the tail frame portion 133 and/or the vertical wall 321 and a second extension arm 22 in the vertical wall 321 caused by insertion in a vertical overlap direction.

Figure 19:
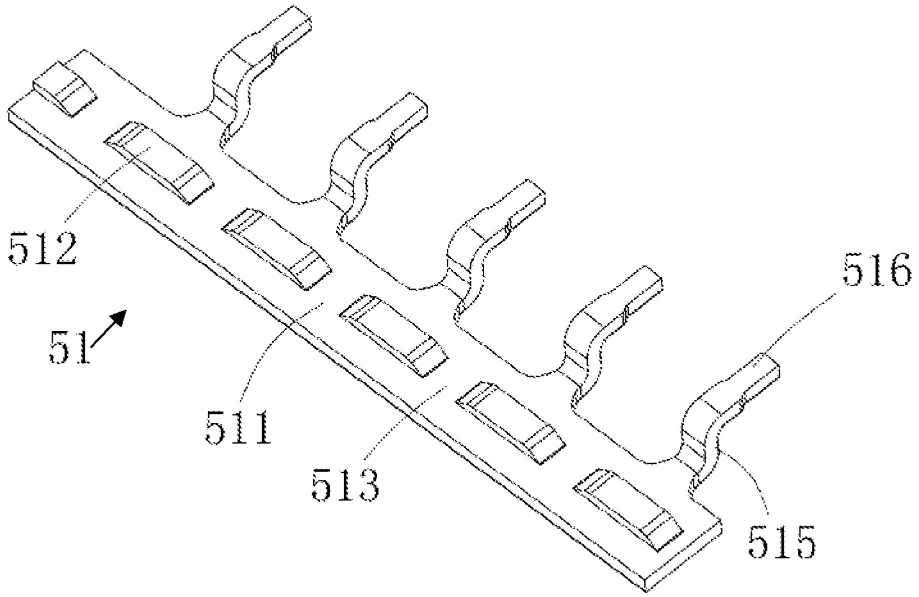
FIG. 19 is a three-dimensional view of a metal rack of the cable bracket of the board-to-board plug according to Embodiment one.
Figure 20:
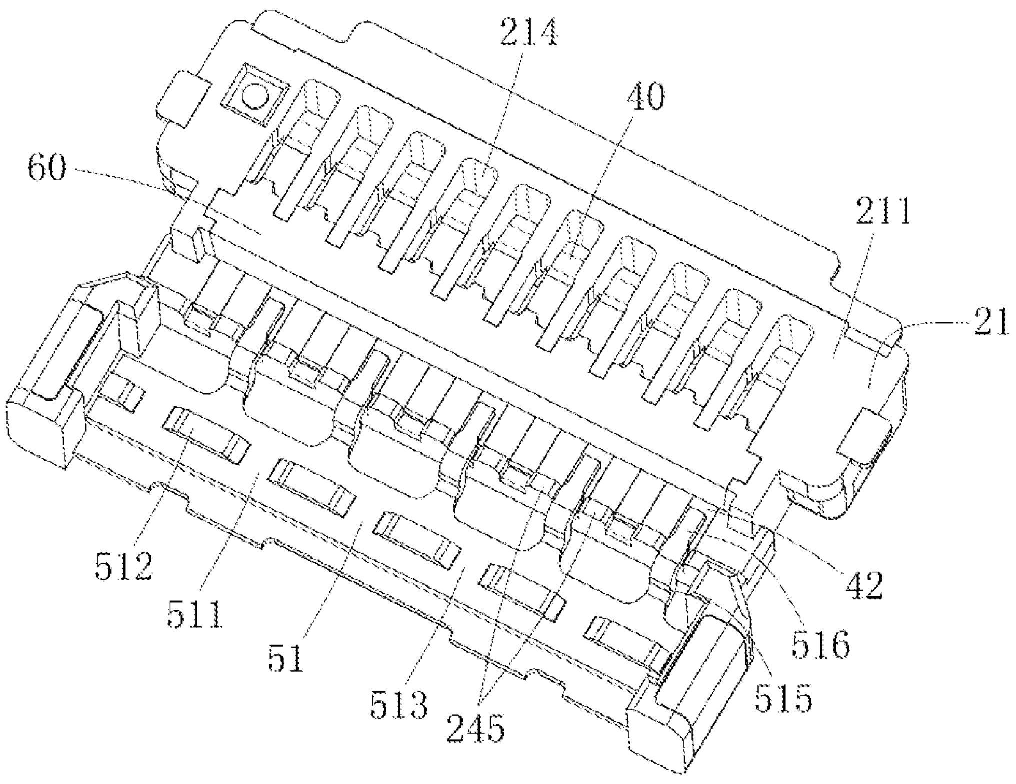
FIG. 20 is a three-dimensional view of an electrical connection state of the metal rack and grounding terminals of the board-to-board plug according to Embodiment one.

Particularly referring to FIG. 19 and FIG. 20, in Embodiment one, a connecting pin 516 extending above the solder pin 42 of the grounding terminal is arranged at the soldering lug 51 of the cable assembly, and the connecting pine 516 and the central conductor C1 of the cable are respectively soldered to the solder pins of the grounding terminal and the signal terminal, thereby preventing a technical problem in the related art that the signal terminal and the grounding terminal are connected to the terminal strip 45 at different positions and required to be broken separately caused by the need of the solder pin 42 of the grounding terminal to extend backward and downward to electrically contact the metal insert 30; and a technical problem in the related art that soldering is required to be performed twice for the connection between the grounding terminal and the metal insert 30 and the connection between the signal terminal and the central conductor C1.

Particularly referring to FIG. 1, FIG. 5, FIG. 9, and FIG. 10, the metal insert 30 in Embodiment one extends forward to form a reinforcing structure formed at the reinforcing arm portion 26 and the front end of the engagement end 21. The reinforcing structure includes a reinforcing bottom wall 33 enclosing an outer side of the side wall 26 and front, rear and side enclosure portions 342, 341 and 35, which can effectively reinforce the strength of the reinforcing arm portion 26 and prevent damages during the insertion. The connecting strip 36 connecting a pair of front enclosure portions 342 protrudes forward to form a positioning convex portion 361 and positioning step portions 362 formed at two sides of the positioning convex portion 361. A front end of the engagement end 21 further protrudes forward to form a front convex portion 216 located at a lower surface of the positioning convex portion 361. The positioning convex portion 361 is forward snapped into the positioning hole 121 formed at the shielding housing 10. The positioning step portions 362 abut against both transverse sides of the positioning hole 121 to prevent shaking, thereby solving a technical problem of insufficient strength of the front convex portion 216 made of plastic caused by limiting only relying on the front convex portion 216 of the engagement end 21 in the related art. At the same time, the connecting strip 36 reinforces the strength of the front end of the engagement end 21, thereby realizing accurate positioning of positions of the insulating seat 20 and the shielding housing 10 and thus ensuring product stability.

Figure 9:
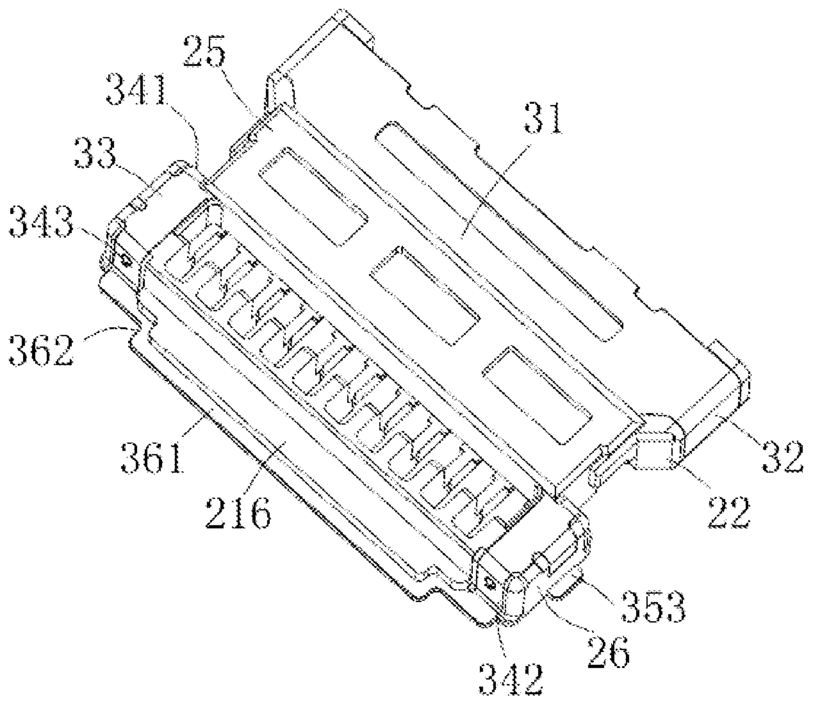
FIG. 9 is a three-dimensional view of the metal insert and the insulating seat of the board-to-board plug according to Embodiment one from another perspective.
Figure 10:
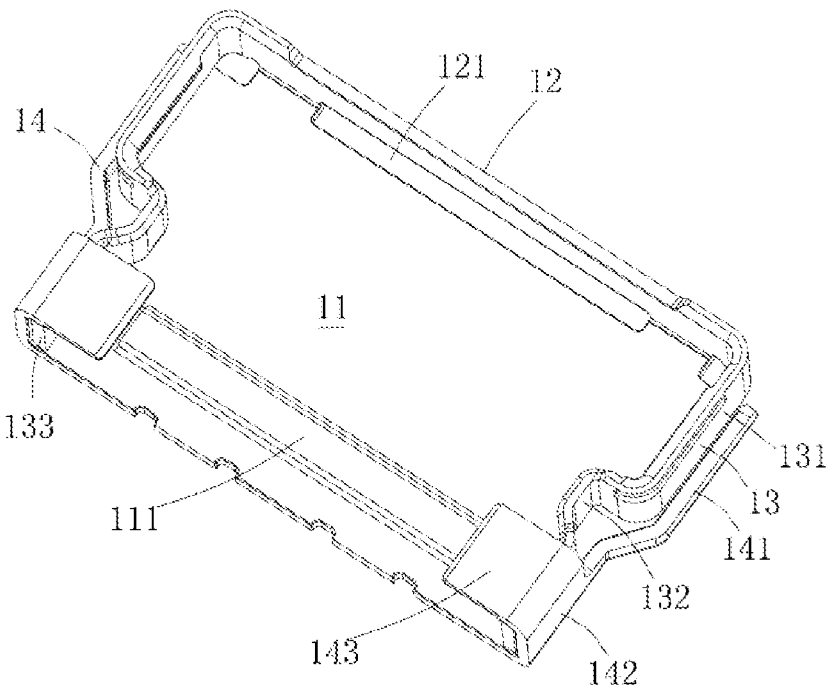
FIG. 10 is a three-dimensional view of a shielding housing of the board-to-board plug according to Embodiment one.
Figure 16:
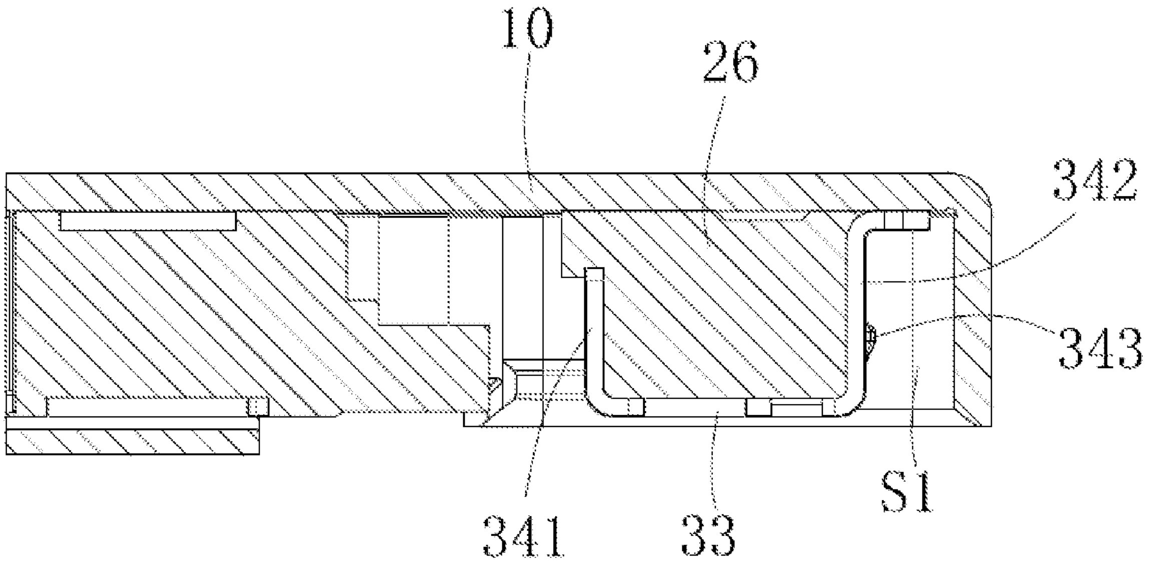
FIG. 16 is a sectional view taken along a line B-B shown in FIG. 1.

Particularly referring to FIG. 5, FIG. 9, and FIG. 16, the front enclosure portion 342 of the reinforcing structure is stamped forward to form a convex hull 343 protruding from the external insertion space S1. When the board-to-board plug according to the present disclosure is inserted into an engaging socket, the convex hull 343 is held back by a metal fastener (not shown) of the socket, enabling the contact portion 435 of the conductive terminal 40 on the engagement end 21 exposed to the internal insertion space 215 to be more consistently and closely contacted backward with a conductive terminal (not shown) of the socket. At the same time, the reinforcing structure enables friction through a metal member when the plug is plugged into the socket, thereby preventing damages to the engagement end of the insulating seat 20. Moreover, the front, rear, and side enclosure portions 342, 341, and 25 of the reinforcing structure are directly bent downward from the reinforcing bottom wall 33, which can ensure the accuracy of bending. Besides, an arc-surface structure is formed at the bending position, and the engagement is performed first through the arc-surface structure, thereby preventing damages to the reinforcing structure by hard interference.

Figure 6:
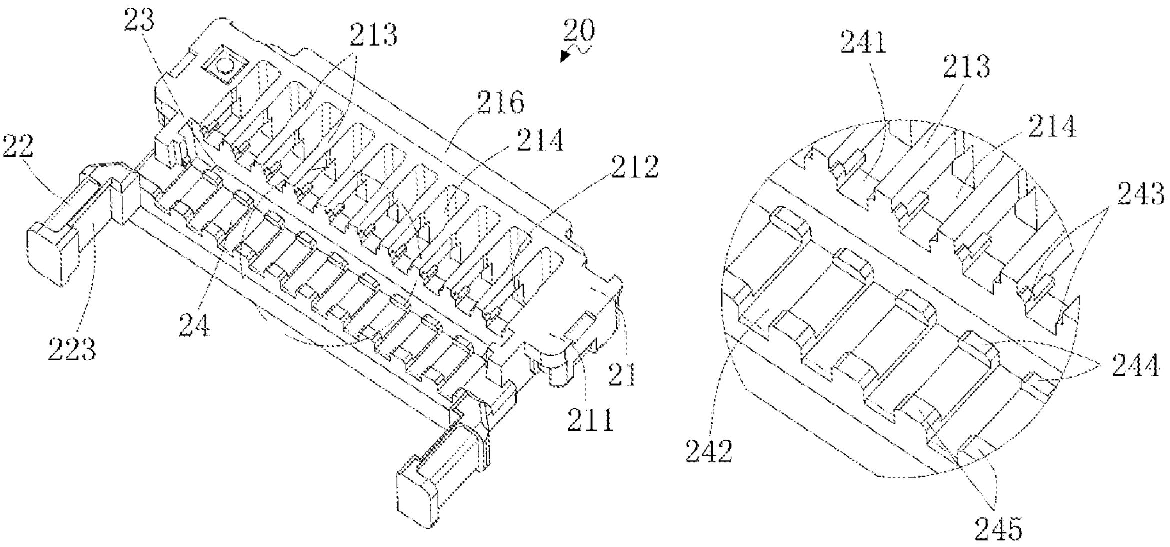
FIG. 6 is a three-dimensional view and a partial enlarged view of an insulating seat of the board-to-board plug according to Embodiment one.
Figure 7:
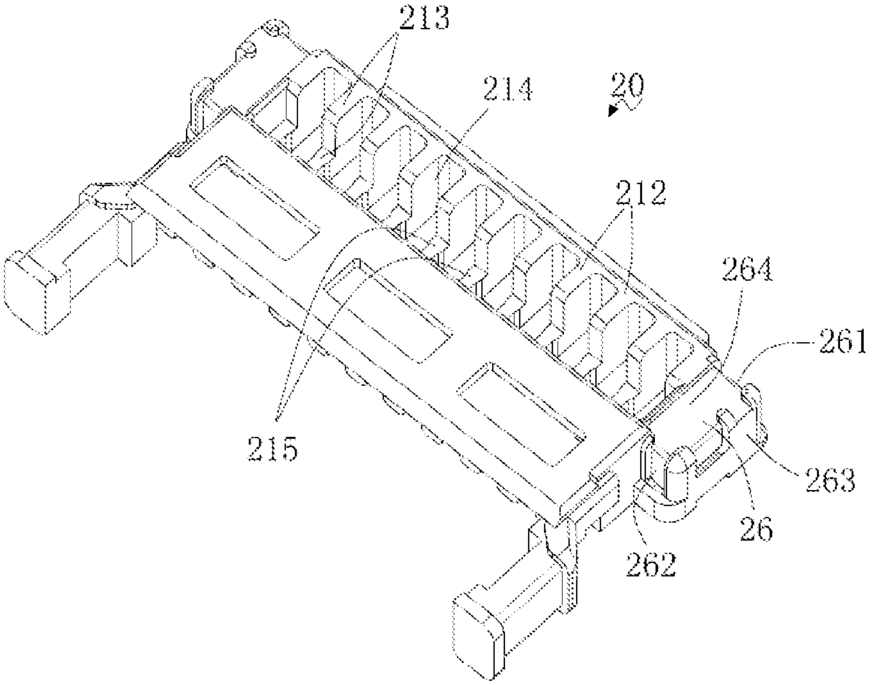
FIG. 7 is a three-dimensional view of the insulating seat of the board-to-board plug according to Embodiment one from another perspective.
Figure 8:
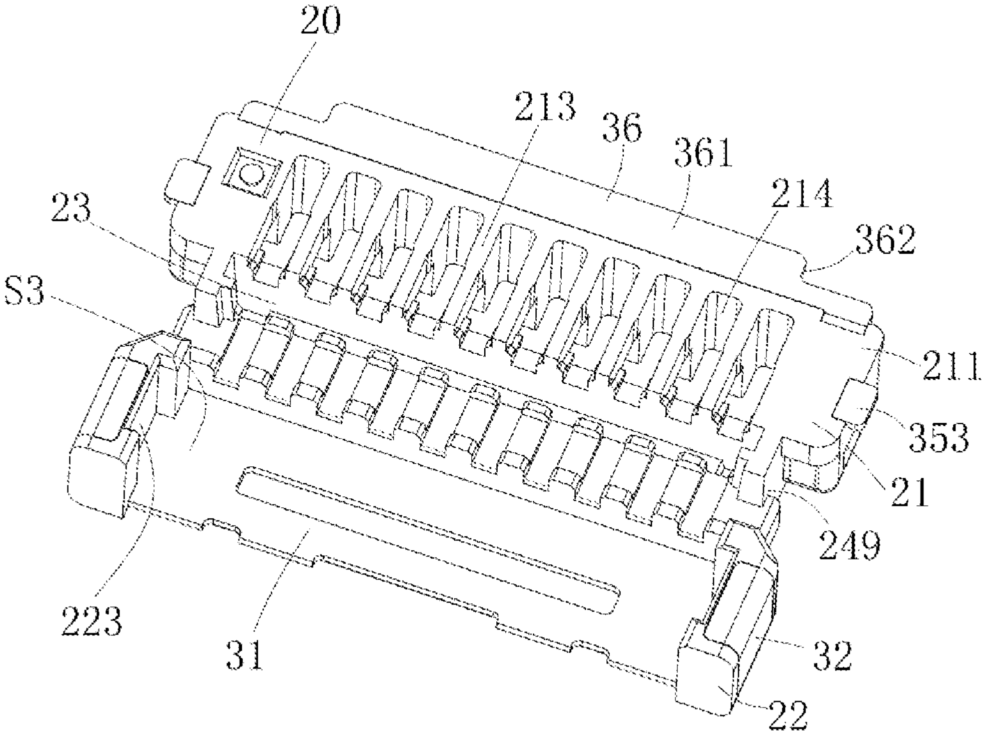
FIG. 8 is a three-dimensional assembled view of the metal insert and the insulating seat of the board-to-board plug according to Embodiment one.
Figure 12:
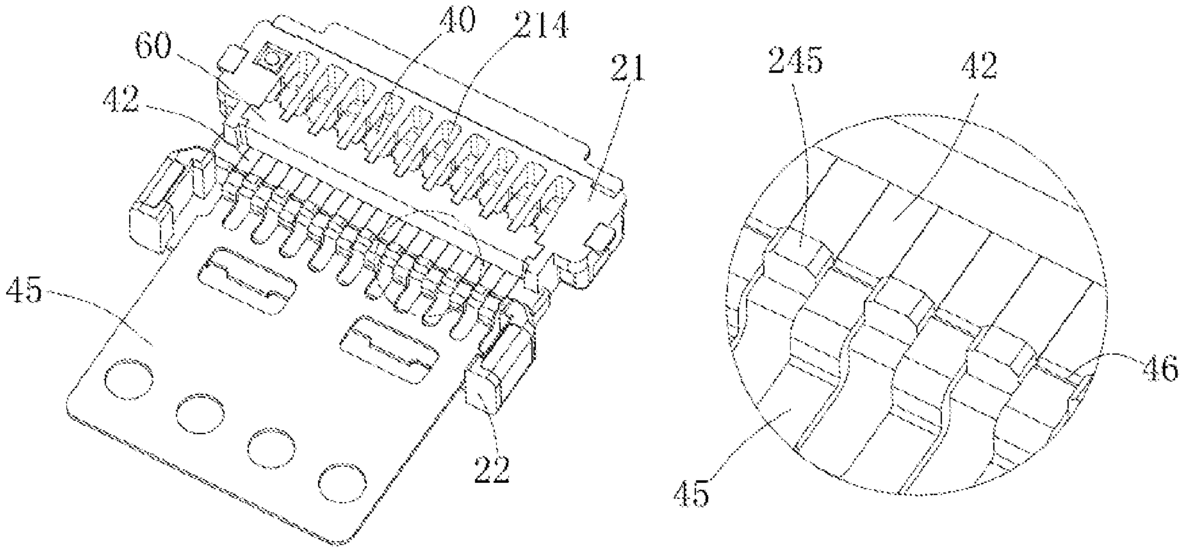
FIG. 12 is a three-dimensional view and a partial enlarged view of a conductive terminal connecting strip of the board-to-board plug formed on the insulating seat by an insulating block according to Embodiment one.
Figure 13:
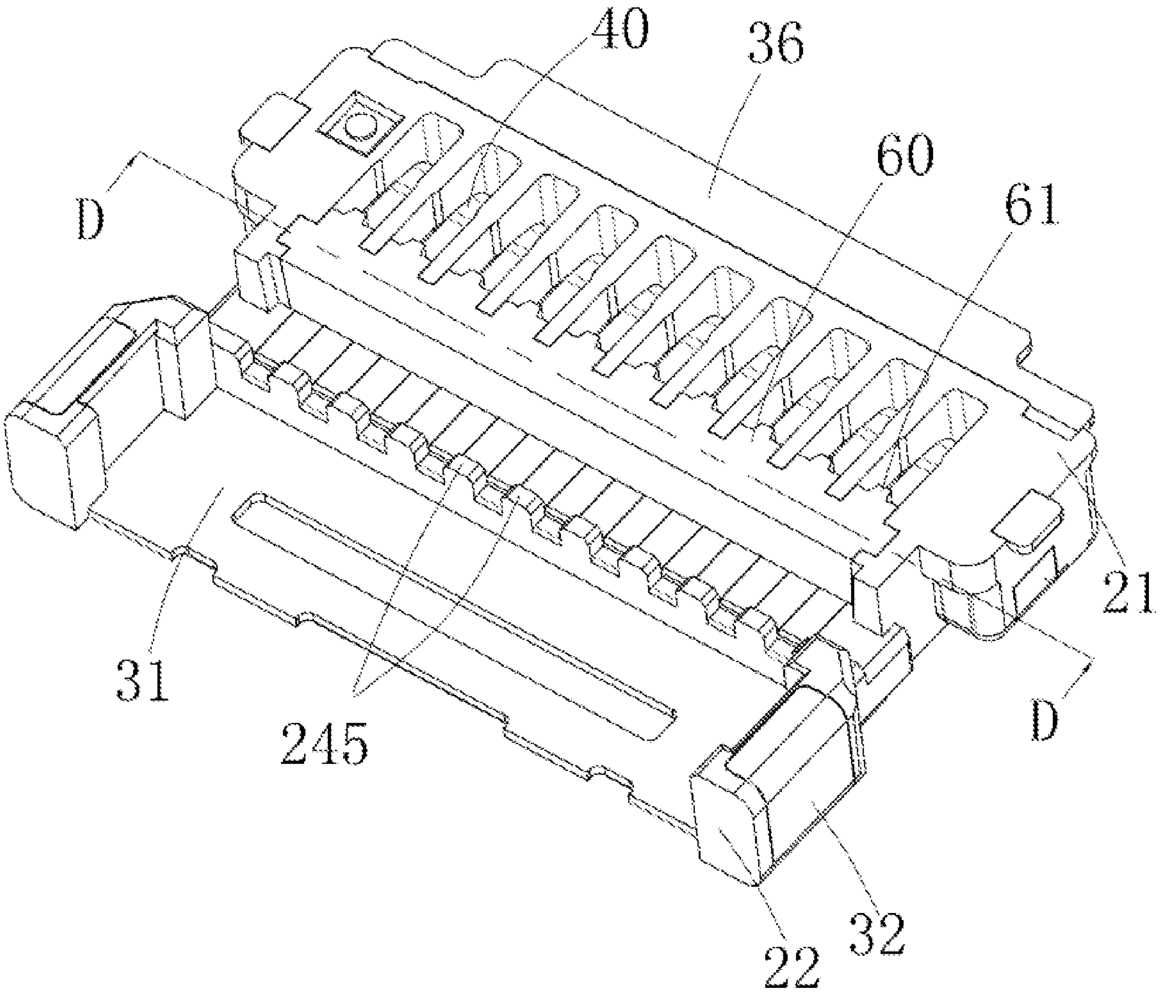
FIG. 13 is a three-dimensional view after removal of the conductive terminal strip in FIG. 12.
Figure 14:
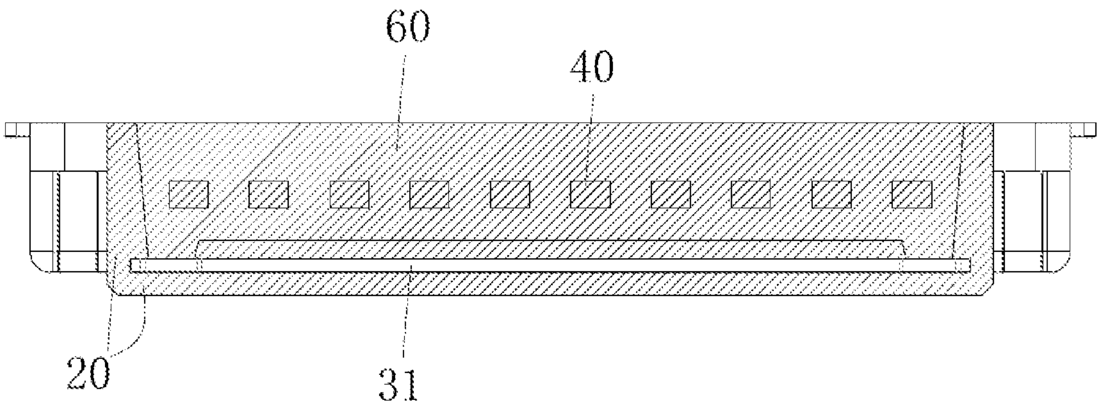
FIG. 14 is a sectional view taken along a line D-D shown in FIG. 13.
Figure 15:
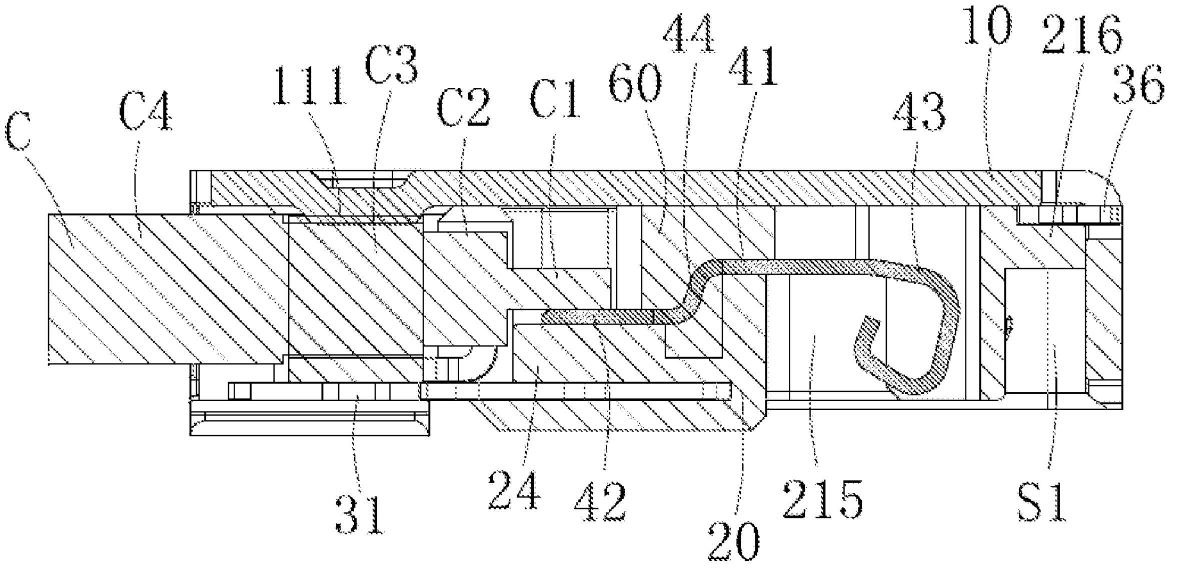
FIG. 15 is a sectional view taken along a line A-A shown in FIG. 1.

Particularly referring to FIG. 6 and FIG. 12, in Embodiment one, the top of the insulating seat 20 extends backward correspondingly along the terminal slot 214 of the engagement end 21 to form a first groove 241 and a second groove 242. First clamping blocks 243 to separate and limit the retaining portions 41 of the conductive terminals 40 are provided at both transverse sides of the first groove 241. Second clamping blocks 244 to separate and limit the solder pins 42 of the conductive terminals 40 are provided at a front end of the second groove 242. Third clamping blocks 245 to separate and limit the central conductors C1 and the connecting pins 516 are provided at a rear end of the second groove 242. With such a configuration, the prevention of deflection and dislocation of the conductive terminals 40 and the limiting of the central conductors C1 and the connecting pins 516 can be achieved, thereby improving a manufacturing yield and quality of the product.

Embodiment Two

Referring to FIG. 21 to FIG. 23, Embodiment two of the present disclosure is different from Embodiment one in terms of the following features. The conductive terminals 40 are provided with only signal terminals during the stamping, grounding terminals are directly formed at the metal insert 30 by integral stamping, and there is no need to arrange the connecting pin 516 on the soldering lug 51. In this embodiment, the conductive terminal 40, the metal insert 30, and the insulating seat 20 are formed into one piece, without needing to injection-mold the conductive terminal 40 again to form the insulating block 60. The metal insert 30 further includes a grounding terminal 37 formed by bending and extending upward from a front end of the front board portion 311 and then bending vertically and extending forward. The grounding terminal 37 is connected integrally to the front end of the front board portion 311 through a vertical portion 371. A structure of the grounding terminal 37 is the same as that of the conductive terminal 40, which is not repeated herein. The grounding terminals 37 and the conductive terminals 40 are arranged at intervals. The conductive terminals 40 are all signal terminals. The vertical portion 371 of the grounding terminal 37 is integrally formed in the terminal block 24. The solder pin of the conductive terminal 40 is located in the second groove 242.

In Embodiment two, the front board portion 311 of the metal insert 30 bends and extends to form grounding terminals 37, only signal terminals are required to be formed by stamping the conductive terminals 40, and only solder pins 42 of the signal terminals are required to be exposed at the terminal blocks 24, thereby increasing a distance between the solder pins 42 and reducing the difficulty of soldering. Moreover, the grounding terminals 37 are directly integrally formed on the metal insert 30, and the solder pins 42 of the signal terminals are in a same horizontal plane to realize bending of a terminal strip at a time, thereby reducing the difficulty of a manufacturing process.

Embodiment Three

Referring to FIG. 24 to FIG. 29, this embodiment is different from Embodiment one in terms of the following features. The grounding terminal is replaced with an isolation assembly 70, a bottom surface 264 of the reinforcing arm portion 26 of the insulating seat 20 is provided with a protruding mesa 2641 located at both transverse sides of the protruding portion 212, the bottom surface 264 is provided with a recessed mesa 2642 located at both transverse sides of the internal insertion space 215, and a bottom surface of the recessed mesa 2642 is higher than that of the protruding mesa 2641. A board body portion 31 of the metal insert 30 is designed separately from the reinforcing structure. The reinforcing bottom wall 33 includes a first reinforcing bottom wall 331 enclosing the protruding mesa 2641, and a second reinforcing bottom wall 332 enclosing the recessed mesa 2642. The first reinforcing bottom wall 331 and the second reinforcing bottom wall 332 are connected to be formed into one piece through the side enclosure portion 35. An inner side of the second reinforcing bottom wall 332 bends and extends upward to form a hook portion 333 embedded in the reinforcing arm portion 26. The front enclosure portion 342 is formed by bending and extending upward from a front end of the first reinforcing bottom wall 331. The rear enclosure portion 341 is formed by bending and extending upward from a rear end of the second reinforcing bottom wall 332. A bottom surface of the first reinforcing bottom wall 331 is flush with a bottom surface of the protruding portion 212. A bottom surface of the second reinforcing bottom wall 332 is higher than that of the first reinforcing bottom wall 332.

The isolation assembly 70 includes a connecting portion 72 formed in a top wall of the protruding portion 212 of the engagement end 21, and several spacers 71 formed by bending downward from a rear end of the connecting portion 72 and extending backward. The connecting portion 72 may reinforce the strength of the protruding portion 212. The spacer 71 includes a first isolation main body 711 partially formed in the protruding portion 212 and separating the terminal slots 214 located at the protruding portion 212, a second isolation main body 712 located in the internal insertion space 215 or the top wall 211 of the engagement end 21 at an upper side of the internal insertion space 215 and formed by extending backward from the first isolation main body 711, a third isolation main body 713 continuously extending backward from the second isolation main body 712 and formed in the terminal block 24, a notch 714 located in the internal insertion space 215 and formed at the spacer 71, and an avoiding portion 715 provided at an upper side of the third isolation main body 713. The spacer 71 has a certain thickness in the vertical direction. The thickness of the spacer 71 in the vertical direction is greater than a depth of the internal insertion space 215, and smaller than or equal to a thickness of the engagement end 21. The avoiding portion 715 is configured to form the terminal block 24 in such a manner that the third isolation main body 713 is not exposed to an upper surface of the terminal block 24. The notch 714 is configured for plug-in with a socket terminal (not shown) to increase a holding force. The spacers 71 are formed by tearing piece by piece from the rear end of the connecting portion 72 and bending downward. The connecting portion 72 is connected, through a bent connecting portion 722, to several spacers 71 to form an entirety. A free end of the third isolation main body 713 exposes a rear end edge of the terminal block 24 to connect a strip. A front end of the connecting portion 72 is also connected to a strip. Each of several conductive terminals 40 is respectively arranged at intervals between two adjacent spacers 71. The spacers 71 can reduce high-frequency signal interference between the conductive terminals 40.

Particularly referring to FIG. 24 and FIG. 29, in Embodiment three, the reinforcing arm portion 26 of the engagement end 21 of the insulating seat 20 is provided with a protruding mesa 2641 at both transverse sides of the protruding portion 212, and a recessed mesa 2642 at both transverse sides of the internal insertion space 215, respectively. At the same time, a reinforcing bottom wall of the reinforcing structure includes a first reinforcing bottom wall 331 and a second reinforcing bottom wall 332 formed into a step structure enclosing the protruding mesa 2641 and the recessed mesa 2642, respectively. The second reinforcing bottom wall 332 and the recessed mesa 2642 may avoid the socket, to enable the contact portion 435 suspended in the terminal slot 214 and located in the internal insertion space 215 to be adjusted upward, so that the product design is more flexible and the contact portion 435 of the conductive terminal 40 can better maintain contact force with the socket terminal (not shown).

Particularly referring to FIG. 24, FIG. 27, and FIG. 28, in Embodiment three, the grounding terminal is replaced with an isolation assembly 70, and the spacer 71 has a certain width in the vertical direction. Compared to a configuration of the grounding terminal, in Embodiment three, high-frequency signal interference between the conductive terminals can be better shielded, thereby significantly increasing frequencies of high frequency waves carried by the conductive terminals 40. Moreover, in Embodiment three, the spacer 71 is further provided with a notch 714 for plug-in with the socket terminal, thereby effectively preventing plugging force lost due to the absence of the grounding terminal. Besides, in Embodiment three, all the spacers 71 are connected to be formed into one piece through the connecting portion 72 at the front end, thereby reinforcing the strength of the engagement end 21 and reducing the manufacturing difficulty.

The above are only some embodiments of the present disclosure and are not intended to limit the present disclosure. The present disclosure may be subject to various changes and variations for those skilled in the art. Any modification, equivalent replacement, improvement etc. made within a spirit and principle of the present disclosure shall fall within a scope of claims of the present disclosure.

What is claimed is:

1. A board-to-board plug, comprising an insulating seat, a metal insert, conductive terminals provided in the insulating seat, a cable assembly provided at a rear end of the insulating seat and electrically connected to the conductive terminals, and a shielding housing enclosing an outer side of the insulating seat, wherein the insulating seat and the metal insert are formed into one piece, wherein the insulating seat comprises an engagement end provided with terminal slots formed by passing therethrough in a vertical direction, wherein the engagement end comprises a top wall, a protruding portion formed by protruding downward from a front end of the top wall, an internal insertion space provided at a lower surface of the engagement end and located at a rear side of the protruding portion, barriers separating the terminal slots from one another, and a reinforcing arm portion formed at both transverse sides of the protruding portion and the internal insertion space, wherein the metal insert comprises a reinforcing structure formed outside the reinforcing arm portion, wherein the reinforcing structure comprises a reinforcing bottom wall formed at a bottom surface of the reinforcing arm portion, and a front enclosure portion bending and extending upward from a front end of the reinforcing bottom wall and formed at a front wall surface of the reinforcing arm portion, and wherein the front enclosure portion is stamped forward to form a convex hull.

2. The board-to-board plug according to claim 1, wherein the insulating seat further comprises: terminal blocks formed by extending from the engagement end to a rear direction, and a pair of extension arms formed by extending from both transverse sides of the terminal blocks to the rear direction; the metal insert further comprises a rear board portion with both transverse sides formed in the pair of extension arms, a front board portion formed by extending from the rear board portion to the front direction, and a clamping portion enclosing the pair of extension arms and formed by bending and extending upward from the both transverse sides of the rear board portion; the reinforcing bottom wall is formed by extending from both transverse sides of a front end of the front board portion to a front outer side; one of the conductive terminals comprises a retaining portion retained in one of the terminal blocks, a solder pin formed by extending backward from the retaining portion, and an elastic contact arm extending forward from the retaining portion into one of the terminal slots; and the conductive terminals comprises signal terminals and grounding terminals arranged at intervals, and the grounding terminals extend backward and are electrically connected to the metal insert.

3. The board-to-board plug according to claim 2, wherein the solder pins of the signal terminals extend to the terminal blocks and are exposed to a surface of the terminal blocks, the solder pins of the grounding terminals pass backward through the terminal blocks and bend upward to be electrically connected to the front board portion of the metal insert, and a part of the grounding terminals located on the terminal block is wrapped with plastic and not exposed to outside.

4. The board-to-board plug according to claim 2, wherein the solder pins of the signal terminals extend to the terminal blocks and are exposed to a surface of the terminal blocks, the grounding terminals are formed by extending integrally from the front end of the front board portion of the metal insert, and a part of the grounding terminals that passes through the terminal blocks is wrapped with plastic and not exposed to outside.

5. The board-to-board plug according to claim 1, wherein the shielding housing comprises a cover plate covering an upper side of the insulating seat, a shielding front frame formed by bending and extending downward from a front end of the cover plate, and a shielding side frame formed by bending and extending backward from both transverse sides of the shielding front frame, wherein an external insertion space is formed between the protruding portion, the reinforcing arm portion, the shielding front frame, and the shielding side frame, and the convex hull is exposed to the external insertion space.

6. The board-to-board plug according to claim 5, wherein the board-to-board plug engages with a board-to-board socket, and the convex hull abuts against a metal part of the board-to-board socket inserted into the external insertion space to cause the reinforcing arm portion to withstand a backward force.

7. The board-to-board plug according to claim 5, wherein the reinforcing structure further comprises: a rear enclosure portion formed by bending upward from a rear end of the reinforcing bottom wall and enclosing a rear wall surface of the reinforcing arm portion, and a side enclosure portion formed by bending upward from an outer side of the reinforcing bottom wall and enclosing a side wall surface of the reinforcing arm portion, wherein the side enclosure portion extends upward to form a spot soldering portion flush with an upper surface of the top wall, and the spot soldering portion is fixed to a lower surface of the cover plate by spot soldering.

8. The board-to-board plug according to claim 7, wherein the side enclosure portion further comprises: an upper extension portion formed by bending and extending upward from the reinforcing bottom wall, and a recessed portion bending inward from the upper extension portion to be formed in the reinforcing arm portion; and the spot soldering portion is formed by bending horizontally from the recessed portion.

9. The board-to-board plug according to claim 7, wherein the reinforcing structure further comprises a connecting strip connecting a top of the front enclosure portion, the connecting strip is formed at a front end of the protruding portion, a front end of the connecting strip protrudes to form a positioning convex portion and positioning step portions formed at both transverse sides of the positioning convex portion, a positioning hole is formed at a position where the cover plate and the shielding front frame are bent, the positioning convex portion is inserted into the positioning hole and the positioning step portions abut against both transverse sides of the positioning hole for limiting.

10. The board-to-board plug according to claim 9, wherein the protruding portion is provided with a front convex portion formed at a lower surface of the positioning convex portion of the connecting strip, and the front convex portion thickens the positioning convex portion in a vertical direction so as to be limited in the positioning hole in the vertical direction.

11. A board-to-board plug, comprising an insulating seat, a metal insert, conductive terminals provided in the insulating seat, and a shielding housing enclosing an outer side of the insulating seat, wherein the insulating seat and the metal insert are formed into one piece, wherein the insulating seat comprises an engagement end provided with terminal slots, terminal blocks formed by extending from the engagement end to a rear direction, and a pair of extension arms formed by extending from both transverse sides of the terminal blocks to the rear direction, wherein the conductive terminals comprise signal terminals and grounding terminals arranged at intervals, wherein the metal insert comprises a board body portion formed between the pair of extension arms, wherein one of the grounding terminals comprises a retaining portion retained in one of the terminal blocks, a solder pin formed by extending backward from the retaining portion, and an elastic contact arm extending forward from the retaining portion into one of the terminal slot, and wherein solder pins of the signal terminals are exposed at the terminal blocks, and wherein the solder pins of the grounding terminals pass through the terminal blocks to extend to the board body portion and is electrically connected to the board body portion.

12. The board-to-board plug according to claim 11, wherein the solder pins of the grounding terminals pass backward through the terminal blocks and bend upward to be electrically lapped on the board body portion, and a part of the grounding terminals that passes through the terminal blocks is wrapped with plastic and not exposed to outside.

13. The board-to-board plug according to claim 11, wherein the engagement end comprises a top wall, a protruding portion formed by protruding downward from a front end of the top wall, an internal insertion space formed at a lower surface of the engagement end and located at a rear side of the protruding portion, barriers separating the terminal slots from one another, and a reinforcing arm portion formed at both transverse sides of the protruding portion and the internal insertion space, wherein the metal insert comprises a reinforcing structure formed outside the reinforcing arm portion, wherein the reinforcing structure comprises a reinforcing bottom wall formed at a bottom surface of the reinforcing arm portion, and a front enclosure portion bending and extending upward from a front end of the reinforcing bottom wall and formed at a front wall surface of the reinforcing arm portion, and the front enclosure portion is stamped forward to form a convex hull.

14. The board-to-board plug according to claim 13, wherein the shielding housing comprises a cover plate covering an upper side of the insulating seat, a shielding front frame formed by bending and extending downward from a front end of the cover plate, and a shielding side frame formed by bending and extending backward from both transverse sides of the shielding front frame, wherein an external insertion space is formed between the protruding portion, the reinforcing arm portion, the shielding front frame, and the shielding side frame, wherein the convex hull is exposed to the external insertion space, wherein the board-to-board plug engages with a board-to-board socket, and the convex hull abuts against a metal part of the board-to-board socket inserted in the external insertion space to cause the reinforcing arm portion to withstand backward force.

15. The board-to-board plug according to claim 14, wherein the reinforcing structure further comprises: a rear enclosure portion formed by bending upward from a rear end of the reinforcing bottom wall and enclosing a rear wall surface of the reinforcing arm portion, and a side enclosure portion formed by bending upward from an outer side of the reinforcing bottom wall and enclosing a side wall surface of the reinforcing arm portion, wherein the side enclosure portion extends upward to form a spot soldering portion flush with an upper surface of the top wall, and the spot soldering portion is fixed to a lower surface of the cover plate by spot soldering.

16. The board-to-board plug according to claim 11, wherein the solder pins of the grounding terminals are a part of the board body portion, and the retaining portions of the grounding terminals are formed by bending and extending from the front end of the board body portion into the terminal blocks.

17. The board-to-board plug according to claim 16, wherein the board body portion comprises: a rear board portion with both transverse sides formed in the pair of extension arms, and a front board portion located at a front end of the rear board portion and formed in the terminal blocks; and the grounding terminals are bent upward from the front board portion and extend into the terminal slots.

18. The board-to-board plug according to claim 17, wherein the conductive terminals and the metal insert form the insulating seat by integral injection molding, a rear end of the retaining portion of one of the grounding terminals bends to form a vertical portion to be integrally connected to the front board portion, the rear board portion is located above the pair of extension arms to form a clamping space, the board-to-board plug further comprises a cable assembly limited in the clamping space, the cable assembly comprises a soldering lug fixed to the rear board portion by spot soldering and cables fixed to the soldering lug, one of the cables comprises a central conductor extending above the solder pin of one of the signal terminals, and the central conductor is integrally soldered with the solder pin of the signal terminal.

19. The board-to-board plug according to claim 18, wherein the soldering lug comprises a soldering lug main body, the soldering lug main body comprises stamping bumps formed by stamping upward and cable limit slots located between the stamping bumps for limiting the cables, and the cables are fixed to the soldering lug main body by soldering tin or by forming conductive adhesive above the soldering lug main body.

20. A board-to-board plug, comprising an insulating seat, conductive terminals provided in the insulating seat, a cable assembly provided at a rear end of the insulating seat and electrically connected to the conductive terminals, and a shielding housing coated outside the insulating seat, wherein the insulating seat comprises an engagement end provided with terminal slots formed by passing therethrough in a vertical direction, an internal insertion space extending transversely and communicated with the terminal slots is formed at the engagement end, and the conductive terminals are arranged respectively corresponding to the terminal slots and exposed to the internal insertion space, wherein the cable assembly comprises cables, one of which comprises at least a central conductor and a braided layer at a periphery of the central conductor, wherein the board-to-board plug further comprises an isolation assembly, and the isolation assembly comprises: a connecting portion formed transversely in the engagement end, and spacers formed by extending longitudinally downward from an end of the connecting portion; and each of the conductive terminals is arranged at an interval between two adjacent ones of the spacers, respectively, and the isolation assembly is electrically connected to the braided layer.

* * * * *